US008095953B2

(12) United States Patent
Hong et al.

(10) Patent No.: US 8,095,953 B2
(45) Date of Patent: Jan. 10, 2012

(54) USER INTERFACE FOR THE IMAGE PROCESSING APPARATUS

(75) Inventors: Ki-joo Hong, Yongin-si (KR); Duk-jin Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 12/053,644

(22) Filed: Mar. 24, 2008

(65) Prior Publication Data

US 2008/0301728 A1 Dec. 4, 2008

(30) Foreign Application Priority Data

Jun. 1, 2007 (KR) ........................ 10-2007-0054036

(51) Int. Cl.

| | |
|---|---|
| ***H04N 7/10*** | (2006.01) |
| ***H04N 7/025*** | (2006.01) |
| ***H04N 5/445*** | (2006.01) |
| ***G06F 3/00*** | (2006.01) |
| ***G06F 13/00*** | (2006.01) |

(52) U.S. Cl. ............................... 725/45; 725/46; 725/47

(58) Field of Classification Search ........................ None
See application file for complete search history.

(56) References Cited

U.S. PATENT DOCUMENTS

| | | | | |
|---|---|---|---|---|
| 6,421,067 | B1 * | 7/2002 | Kamen et al. | 715/719 |
| 6,481,011 | B1 * | 11/2002 | Lemmons | 725/47 |
| 2002/0047946 | A1 * | 4/2002 | Yuen et al. | 348/738 |
| 2002/0194600 | A1 * | 12/2002 | Ellis et al. | 725/41 |
| 2004/0078814 | A1 * | 4/2004 | Allen | 725/47 |
| 2006/0064716 | A1 * | 3/2006 | Sull et al. | 725/37 |
| 2007/0061840 | A1 * | 3/2007 | Walter et al. | 725/39 |

OTHER PUBLICATIONS

Office Action dated May 5, 2011 from the Chinese Patent Office in counterpart Chinese application No. 200810085652.4.

* cited by examiner

*Primary Examiner* — Andrew Koenig
*Assistant Examiner* — Jason J Chung
(74) *Attorney, Agent, or Firm* — Sughrue Mion, PLLC

(57) ABSTRACT

An image processing apparatus is provided. The image processing apparatus includes a receiver which receives a broadcasting signal of a program corresponding to at least one of a plurality of categories; a UI generator which generates a UI having at least one of a plurality of attributes and capable of being displayed for the program; an image processing unit which performs image processing for the received broadcasting signal; and a controlling unit which controls the UI generator so that the attribute of the program can correspond to the category of the program.

27 Claims, 10 Drawing Sheets

USER INTERFACE FOR THE IMAGE PROCESSING APPARATUS

CROSS-REFERENCE TO RELATED APPLICATIONS

This application claims priority from Korean Patent Application No. 10-2007-0054036, filed on Jun. 1, 2007 in the Korean Intellectual Property Office, the disclosure of which is incorporated herein by reference.

BACKGROUND OF INVENTION

1. Field of Invention

Apparatuses and methods consistent with the present invention relate to an image processing apparatus and an image processing method, and more particularly, to an image processing apparatus and an image processing method which can generate a user interface about program information.

2. Description of the Related Art

In general, an image processing apparatus receives a broadcasting signal from a broadcasting station and processes the broadcasting signal into a visible image. Recently, as contents of digital broadcasting become diverse, the number of channels included in the received broadcasting signal is also increased. Accordingly, the image processing apparatus receiving and processing the digital broadcasting can give a user wide channel options, but is inconvenient for the user to select a program belonging to his or her wanted category due to the increased number of channels.

To solve the problem, a conventional image processing apparatus displays information on the category of a program included in a broadcasting signal together with an image of the program, thereby allowing a user to select the program belonging to his or her wanted category without difficulty.

However, in the case of displaying the information on the category together with additional information such as an image mode, resolution, etc., and in the case of displaying only information on the category, the conventional image processing apparatus displays the information in the same format. Thus, it is difficult that the user grasps the category of the program.

SUMMARY OF THE INVENTION

Accordingly, it is an aspect of the present invention to provide an image processing apparatus and an image processing method which can generate a user interface having a different attribute for each category of a program so that the user can grasp the category of the program without difficulty.

Another aspect of the present invention is to provide an image processing apparatus and an image processing method which can set a UI attribute to the attribute wanted by the user, thereby improving user's convenience.

Additional aspects of the present invention will be set forth in part in the description which follows and, in part, will be obvious from the description, or may be learned by practice of the present invention.

The foregoing and/or other aspects of the present invention can be achieved by providing an image processing apparatus including a tuner which receives a broadcasting signal of a program corresponding to at least one of a plurality of categories; a UI processor which generates a UI having at least one of a plurality of attributes and capable of being displayed for the program; an image processor which performs image processing for the received broadcasting signal; and a controller which controls the UI processor so that the attribute of the UI can correspond to the category of the program.

The UI attribute may comprise at least one of a color, a font, and a theme.

The category of the program may comprise at least one of a movie, a drama, news, sports, and a documentary.

The image processing apparatus may further comprise a display unit which displays the generated UI.

The controlling unit may control the UI generator to display the UI on the display unit during tuning a channel selected among the plurality of channels.

The image processing apparatus may further comprise a user input unit through which a user's instruction for the UI attribute is inputted, and the controlling unit may determine the UI attribute corresponding to the category according to the inputted instruction.

The controlling unit may control the UI generator to generate an attribute setting UI for setting the UI attribute and display the attribute setting UI on the display unit.

In the case of setting the plurality of attributes, the controlling unit may control the UI generator to reflect the previously set attribute to the attribute setting UI to be displayed on the display unit.

The image processing apparatus may further comprise a storage unit which stores information on the UI attribute, and the controlling unit may determine the UI attribute corresponding to the category according to the stored information.

The foregoing and/or other aspects of the present invention can be also achieved by providing an image processing method comprising: receiving a broadcasting signal of a program corresponding to at least one of a plurality of categories; generating a UI capable of being displayed for the program so that a UI attribute having at least one of a plurality of attributes can correspond to the category of the program.

The UI attribute may comprise at least one of a color, a font, and a theme.

The category of the program may comprise at least one of a movie, a drama, news, sports, and a documentary.

The generating the UI may comprise displaying the generated UI.

The displaying the generated UI may display the UI during tuning a channel selected among a plurality of channels.

The generating the UI may comprise: receiving a user's instruction for the UI attribute, and determining the UI attribute corresponding to the category according to the user's instruction.

The generating the UI may further comprise: generating an attribute setting UI for setting the UI attribute, and displaying the generated attribute setting UI.

The displaying the attribute setting UI may reflect the previously set attribute to the attribute setting UI to be displayed in the case of setting the plurality of UI attributes.

The generating the UI may further comprise: storing information on the UI attribute, and determining the UI attribute corresponding to the category according to the stored information.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
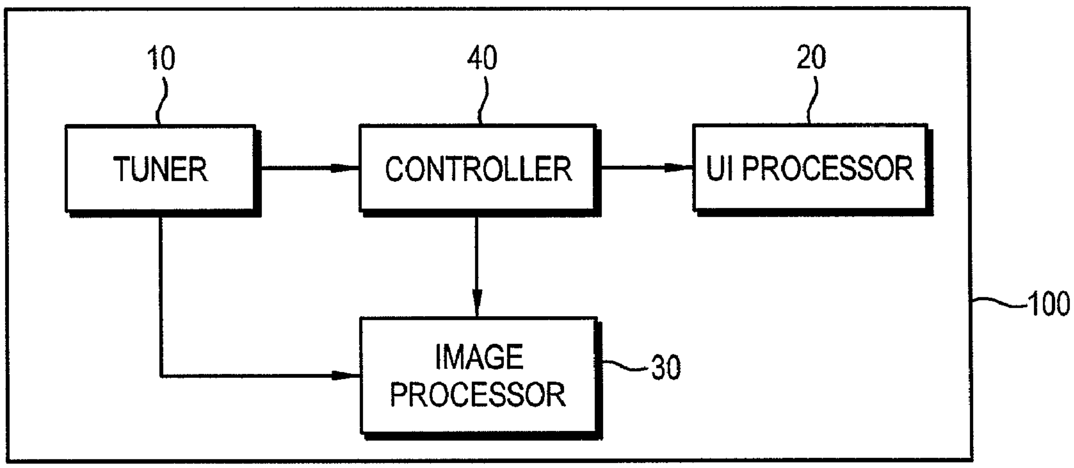
FIG. 1 is a block diagram showing a configuration of an image processing apparatus according to a first exemplary embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

FIG. 1 is a block diagram illustrating a configuration of an image processing apparatus 100 according to a first exemplary embodiment of the present invention. As shown in FIG. 1, the image processing apparatus 100 according to the first exemplary embodiment of the present invention includes a receiver 10, a UI generator 20, an image processing unit 30, and a controlling unit 40. The image processing apparatus 100 according to the first exemplary embodiment of the present invention may be provided as a digital TV, a set-top box, etc.

The receiver 10 receives a broadcasting signal of a program corresponding to at least one of a plurality of categories. The receiver 10 according to the present embodiment may have an antenna, a digital tuner, and an analog tuner which are not shown.

The digital tuner and the analog tuner each tune the broadcasting signal received through the antenna to a broadcasting signal having a frequency band corresponding to a tuning controlling signal of the controlling unit 40.

The UI generator 20 generates a UI having at least one attribute of a plurality of attributes with respect to the program. Herein, the UI attribute may include at least one of a color, a font, and a theme. Here, the UI generator 20 may process the UI into an image capable of being displayed in addition to the image processing for the program received by the receiver 10. The UI generated by the UI generator 20 according to the present invention will be described later.

The image processing unit 30 performs the image processing for the broadcasting signal received by the receiver 10. The image processing unit 30 according to the present embodiment may perform decoding for extracting image information from the received broadcasting signal, scaling for adjusting resolution of the decoded image according to the attribute of a display unit 50 to be described later and user's setting, a picture enhancement for enhancing the quality of the image, and so on. Also, the image processing unit 30 may perform the image processing for the UI so that the UI generated by the UI generator 20 can be displayed on the display unit 50.

The controller 40 controls the UI generator 20 so that the UI attribute generated by the UI generator 20 can correspond to the category of the program. Herein, the categories of the program may be classified with a certain reference such as movies, dramas, news, sports, and documentaries. The controller 40 according to the present embodiment may be realized as a controller such as a microcomputer, a CPU, etc. or software.

The broadcasting signal received by the receiver 10 is divided to a video signal, an audio signal, and auxiliary information defined as a program and service information protocol (PSIP) by a demultiplexer (not shown). The controller 40 extracts the category of the program from the divided auxiliary information. The controlling unit 40 judges whether the extracted category belongs to a predetermined category or not, and determines the UI attribute corresponding to the category if the extracted category belongs to one of the predetermined categories. Then, the controlling unit 40 controls the UI generator 20 to generate the UI of the determined attribute. Thus, the user can grasp the category of the program at a glance and may choose his or her wanted channel without difficulty.

Hereinafter, an image processing apparatus 200 according to a second exemplary embodiment of the present invention will be described with reference to FIG. 2.

Figure 2:
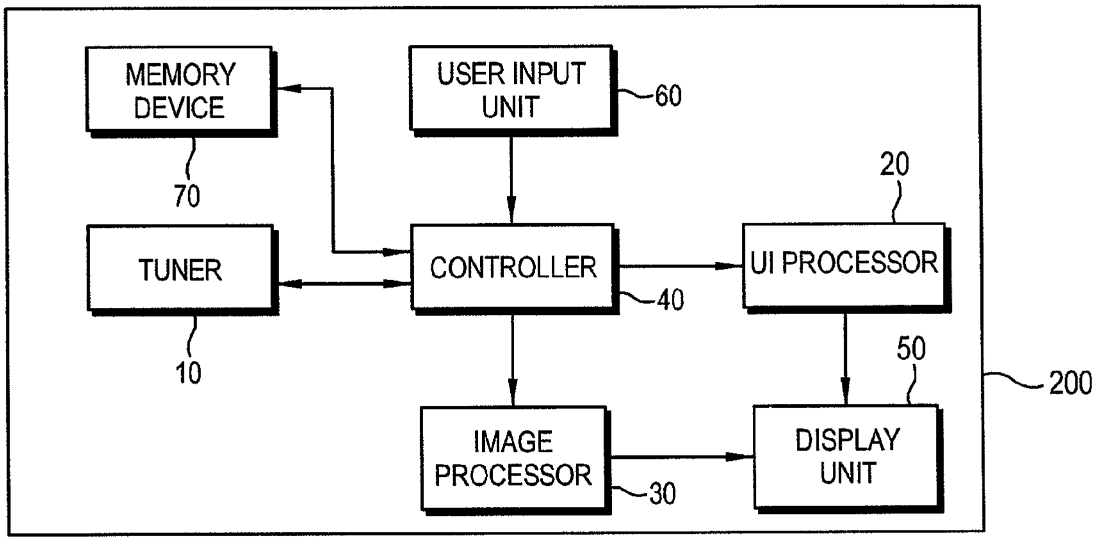
FIG. 2 is a block diagram showing a configuration of an image processing apparatus according to a second exemplary embodiment of the present invention.

As shown in FIG. 2, the image processing apparatus 200 according to the second exemplary embodiment of the present invention further includes a display unit 50, a user input unit 60, and a storage unit 70, in addition to the elements of the image processing apparatus 100 according to the first exemplary embodiment. Description for the same elements as those of the image processing apparatus 100 according to the first exemplary embodiment of the present invention may be omitted.

The display unit 50 displays the image processed by the image processing unit 30 and the image generated by the UI generator 20. The display unit 50 according to the present invention may be realized as a cathode ray tube (CRT), a liquid crystal display (LCD), a plasma display panel (PDP), a digital light processing (DLP), a surface-conduction electron-emitter display (SED), a field emission display (FED), etc.

Meanwhile, it is preferable but not necessary that in the display unit 50 is displayed the image of the program corresponding to the single channel selected by the user. However, the image of the program corresponding to the plurality of channels by picture in picture (PIP), etc. may be displayed. At this time, the controlling unit 40 may control the image processing unit 30 to display the plurality of images on the display unit 50, and control the UI generator 20 to display the UI corresponding to each program.

The user input unit 60 receives a user's instruction about the UI attribute generated by the UI generator 20. The user input unit 60 according to the present embodiment may be realized as a wireless remote controller, and have a key signal generator generating a key signal corresponding to a menu key and a key operation as well as other types of remote control units having pointing devices incorporated therein. Alternatively, the user input unit 60 according to the present embodiment may be provided on a side of a main body of the image processing apparatus 200.

The storage unit 70 stores the information about the UI attribute corresponding to one or more categories generated by the UI generator 20. The storage unit 70 according to the present embodiment may be provided as a non-volatile memory such as a flash memory, hard disc, etc. The storage unit 70 may further store information regarding a font and a theme received externally which may offer more flexibility in the type of the UI attribute available to the user. The storage unit 70 has a separate storage space for storing channel map information for the channel capable of displaying the present image.

Hereinafter, a process of setting the UI attribute generated by the UI generator 20 in the image processing apparatus 200 according to the present invention will be described with reference to FIGS. 3A through 3D.

First, if a user operates a button included in the user input unit 60 to display an attribute setting user interface 300 for setting the UI attribute to the display unit 50, as shown in FIGS. 3A through 3D, the user interface 300 providing a combo box to select the category of the program and the UI attribute corresponding to the category of the program is generated.

Figure 3A:
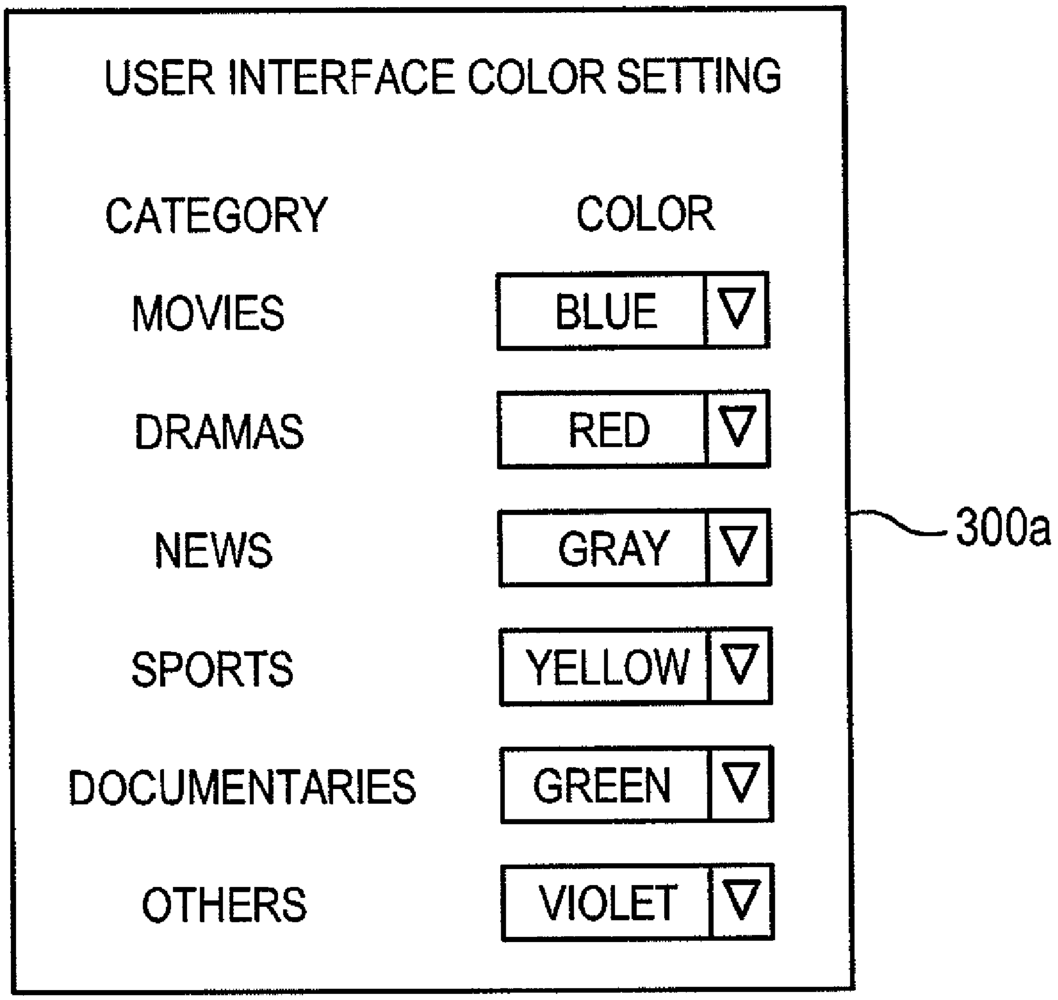
FIGS. 3A through 3D illustrate a process of setting a UI attribute in an image processing apparatus according to the present invention.

FIG. 3A illustrates a user interface 300*a* to set a color among the UI attributes in the image processing apparatus 200 according to the present invention. As shown in FIG. 3A, the UI color of the user interface 300*a* may be selected by the user through the combo box, but alternatively, may be selected through a color table that is displayed with RGB colors. In the case of using the color table, the user can set the UI color of the user interface 300*a* by selecting a predetermined position of the color table. Also, each value of RGB may be directly inputted through the user input unit 60. Thus, the UI of different colors may be generated according to the category of the program. Furthermore, the designation of the color in FIG. 3A may be reflected on the color of the channel number and/or the channel name that may be displayed. That is, if a program of a particular channel is of a certain category, the color of the channel name or the channel number may be displayed corresponding to the previously user set color for that category. The same may apply for the setting of the font explained in FIG. 3B.

Herein, the controlling unit 40 determines whether the same UI color is set corresponding to different categories or not, and if the same UI color is set corresponding to the different categories, the controlling unit 40 may output a predetermined message.

Further, if the category of the program does not belong to movies, dramas, news, sports, and documentaries, the controlling unit 40 may control the category of the program to be displayed as a separate item like an 'others' item.

Figure 3B:
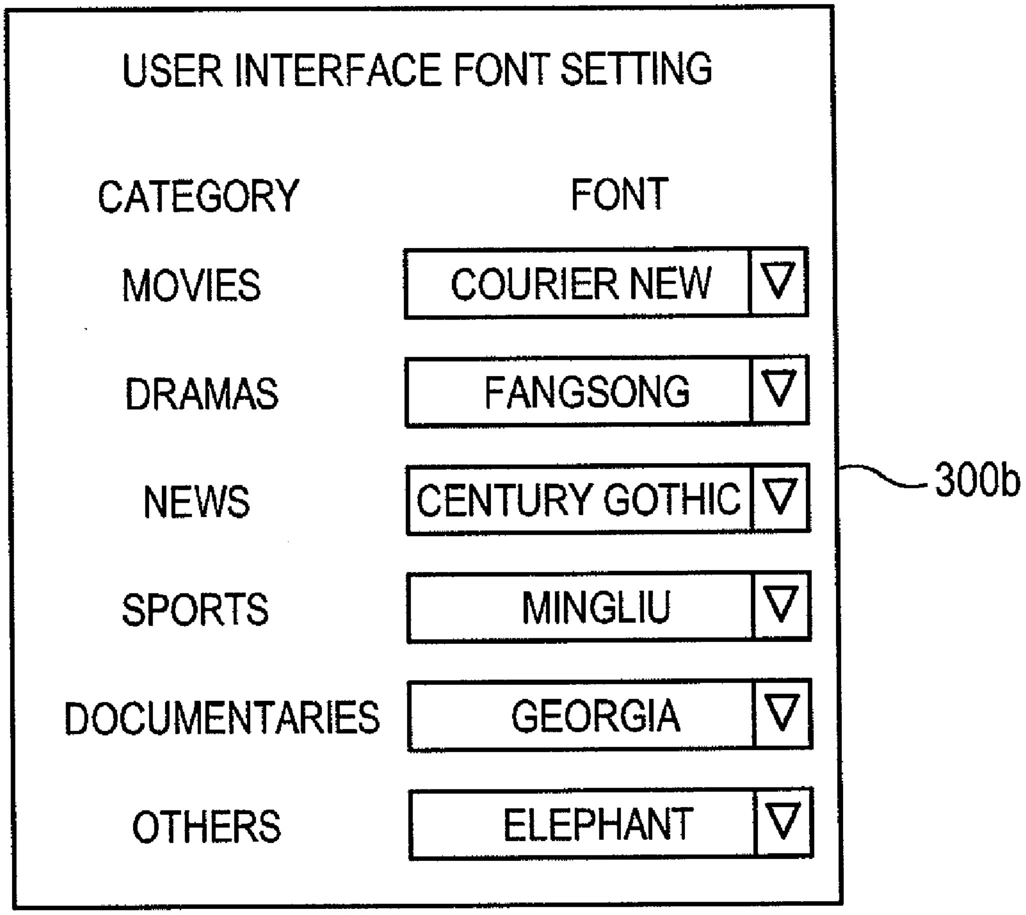

FIG. 3B illustrates a user interface 300*b* to set a font among the UI attributes in the image processing apparatus 200 according to the present invention. As shown in FIG. 3B, a combo box is provided to select the font of the UI corresponding to the category of the program in the user interface 300*b*. Accordingly, the UI of different fonts according to the category of the program may be generated.

The controlling unit 40 determines whether the same UI font is set corresponding to different categories or not, and may output a predetermined message if the same UI color is set corresponding to the different categories. Meanwhile, the image processing apparatus 200 according to the present invention may receive the font wanted by the user from the outside through a communication part (not shown).

Figure 3C:
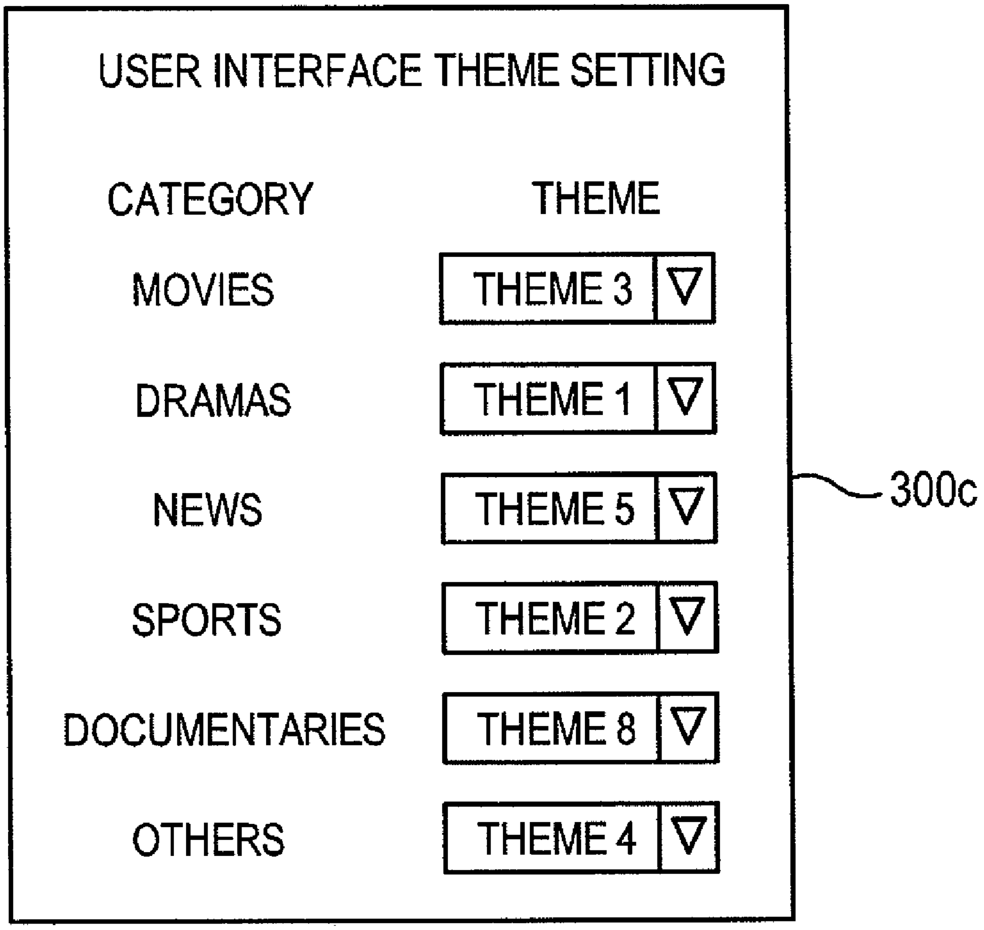

FIG. 3C illustrates a user interface 300*c* to set a theme among the UI attributes in the image processing apparatus 200 according to the present invention. Herein, the theme of the UI may include not only the image displayed in the display unit 50, but also sound effects during the button input, etc.

Like the color and the font, the controlling unit 40 determines whether the same UI theme is set corresponding to the different categories or not, and may output a predetermined message if the same UI theme is set corresponding to the different categories.

Further, the theme of the UI may be also downloaded from the outside, and stored in the storage space. Also, the controlling unit 40 may control the UI generator 20 or the image processing unit 30 to provide a preview function for the theme selected presently.

Figure 3D:
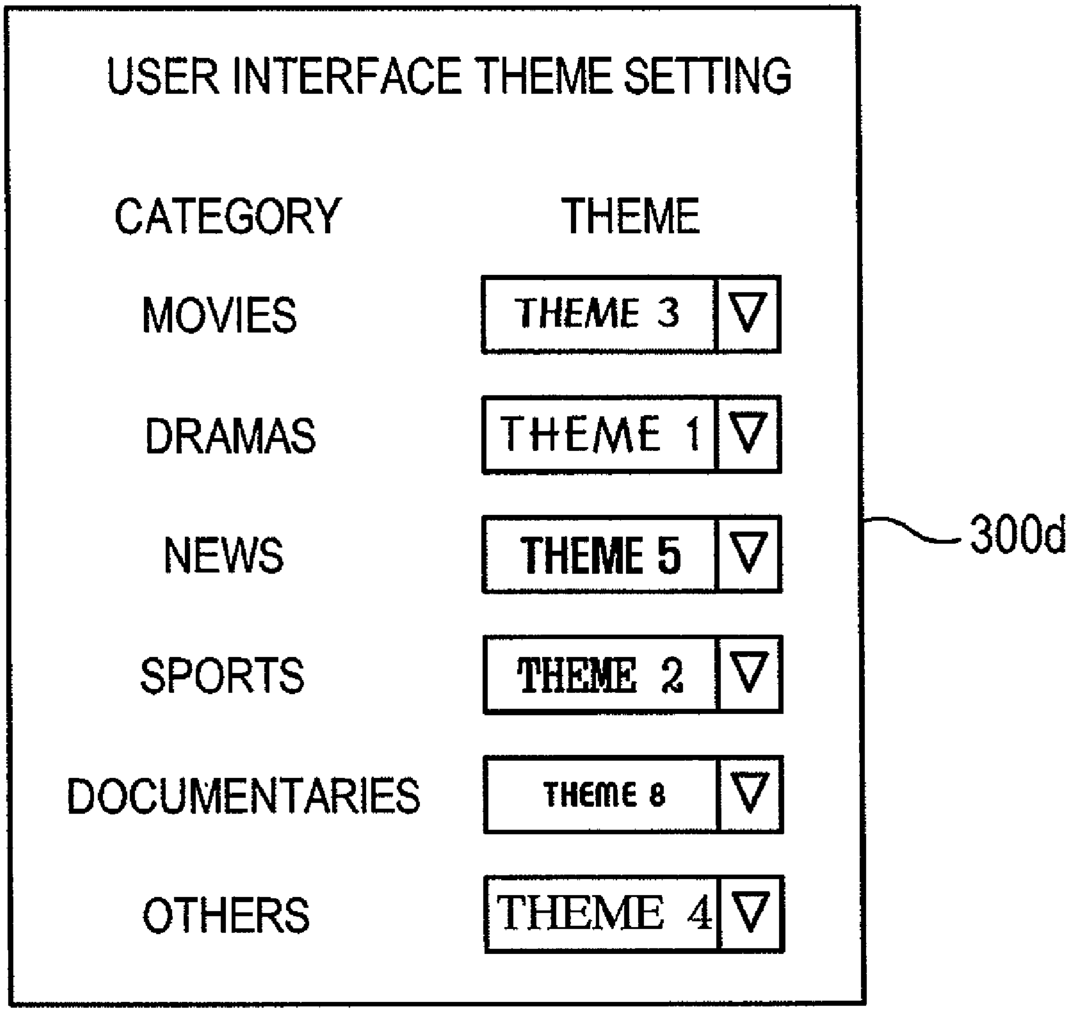

Meanwhile, FIG. 3D illustrates a user interface 300*d* to set the plurality of UI attributes. As shown in FIG. 3D, if the user wants to set two attributes, for example, the font and the theme, the controlling unit 40 may control the UI generator 20 so that the user interface 300*d* can be displayed in the display unit 50 to set the theme in the state that the font of the UI set by the user through the user interface 300*b* in FIG. 3B is displayed on the display unit 50.

Hereinafter, a user interface 400 in the image processing apparatus 200 according to the present embodiment will be described with reference to FIGS. 4A and 4B.

Figure 4A:
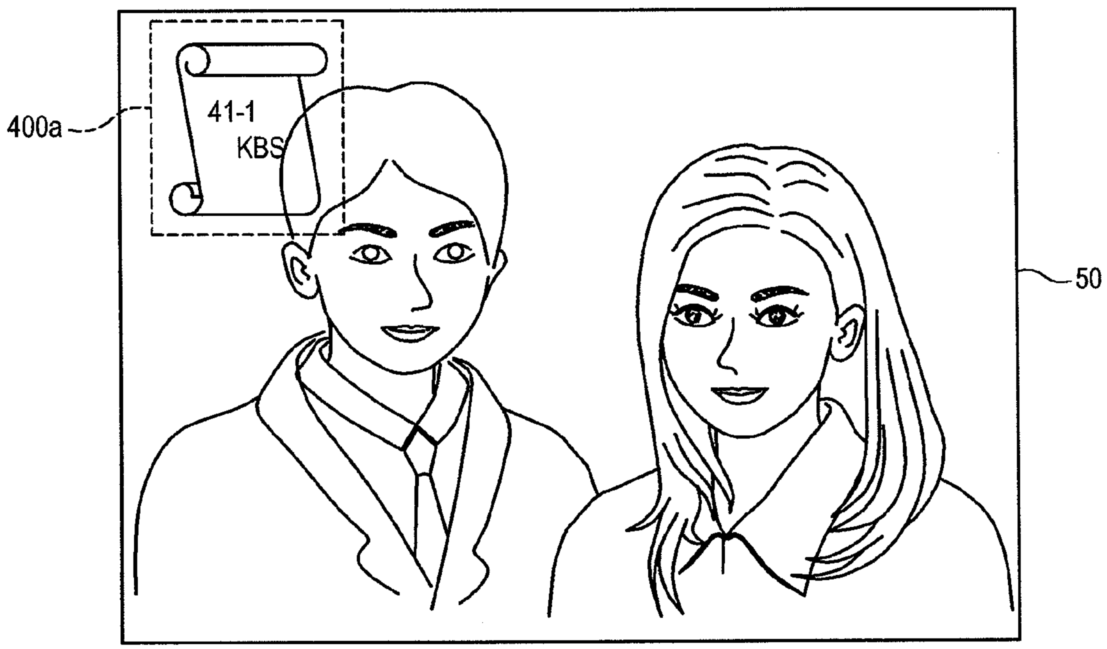
FIGS. 4A and 4B illustrate a user interface of the image processing apparatus according to the present invention.
Figure 4B:
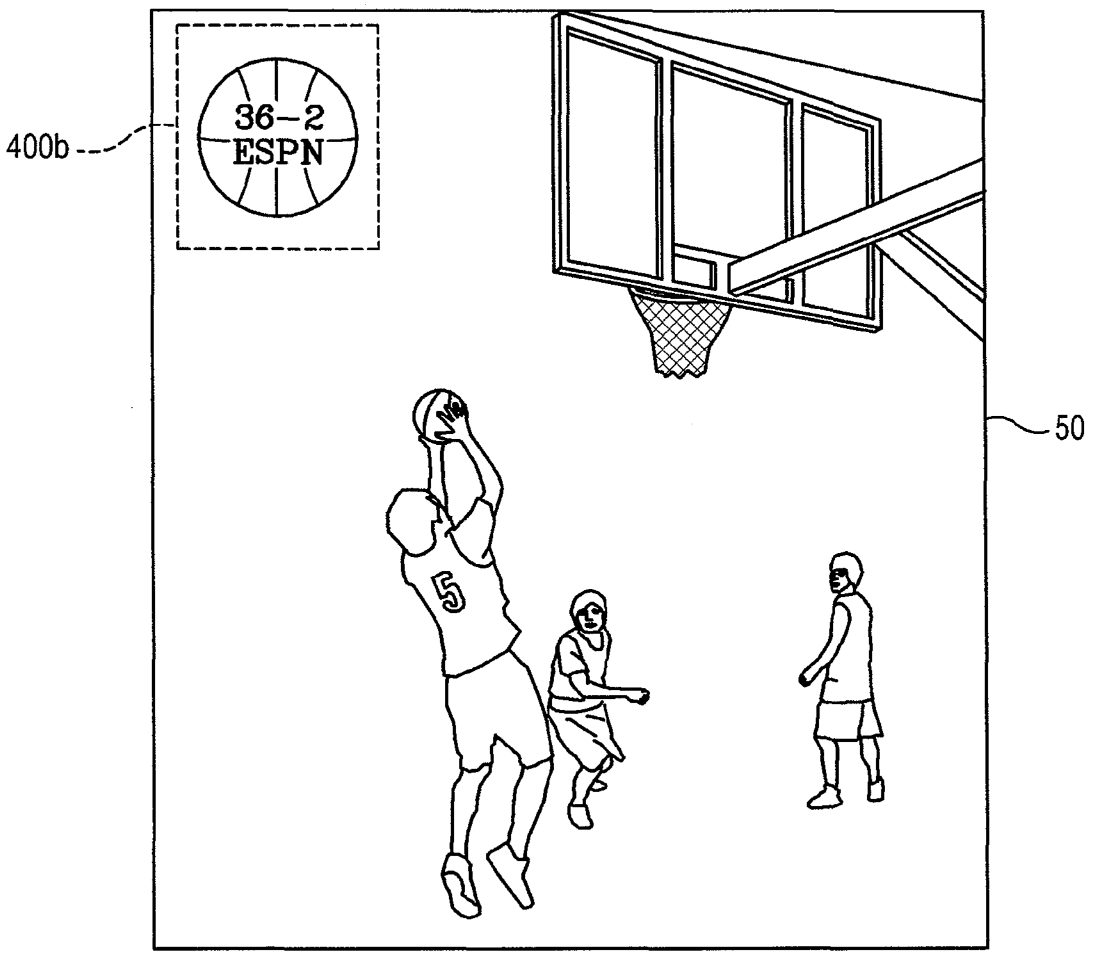

FIG. 4A illustrates a UI 400*a* generated by the UI generator 20, instancing movies as the category of the presently displayed program, and FIG. 4B illustrates a UI 400*b* generated by the UI generator 20, instancing sports as the category of the presently displayed program.

It is preferable but not necessary that the controlling unit 40 controls the UI generator 20 so that the UI generated by the UI generator 20 is displayed on the display unit 50 for a predetermined period of time if a user tunes channels. The display timing of the UI may occur as soon as the category of the program can be ascertained or the UI may be displayed after the video image is decoded and displayed on the display unit. Furthermore, the display of the UI may occur automatically upon or after a channel change or may occur upon a user's manual input. Accordingly, the user may easily grasps whether the channel of the program of his or her wanted category is selected or not during channel tuning.

Herein, FIGS. 4A and 4B illustrate the case that only the image corresponding to the single program is displayed on the display unit 50, but a separate UI may be displayed in a sub screen corresponding to the category of the program displayed in the sub screen if the image processing apparatus 200 according to the present embodiment has a picture in picture (PIP) function.

Figure 5:
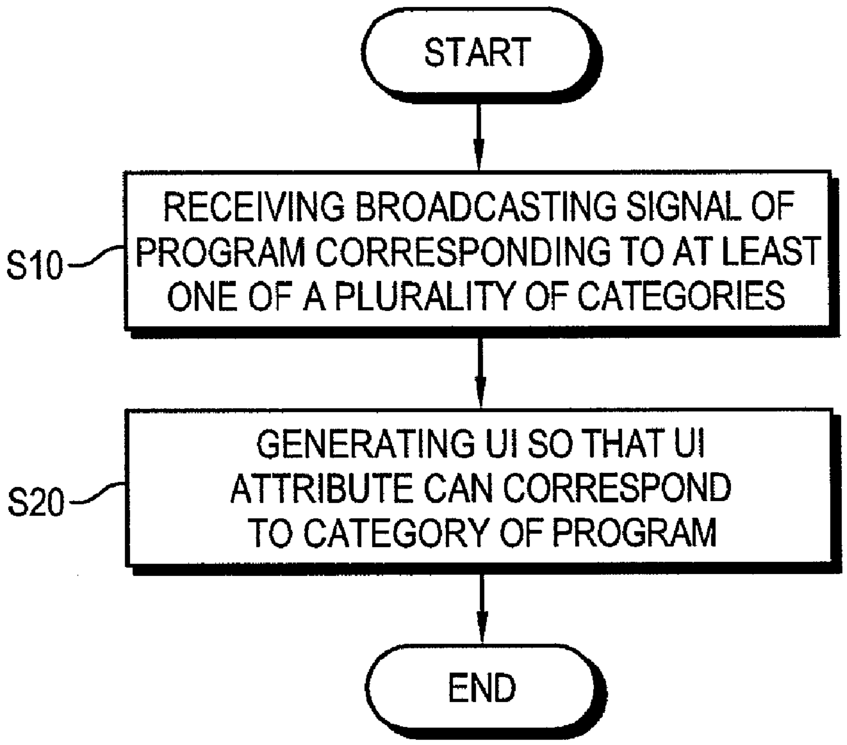
FIG. 5 is a flowchart showing an image processing method according to a first exemplary embodiment of the present invention.

Hereinafter, an image processing method according to a first exemplary embodiment of the present invention will be described with reference to FIG. 5.

First, a broadcasting signal of the program corresponding to at least one of a plurality of categories is received (S10). Also, a UI capable of being displayed for the program is generated so that a UI attribute having at least one of a plurality of attributes can correspond to the category of the program (S20).

Herein, the step S20 may further include the step of displaying the generated UI, which may display the UI during tuning a channel selected among a plurality of channels.

Also, the step S20 may further include the step of receiving a user's instruction about the UI attribute and the step of determining the UI attribute corresponding to the category according to the inputted instruction. Also, it is possible to determine the UI attribute corresponding to the category by the information previously stored instead of the user's instruction.

Accordingly, the user may grasp the category of the program at a glance, and may select his or her wanted channel without difficulty.

Figure 6:
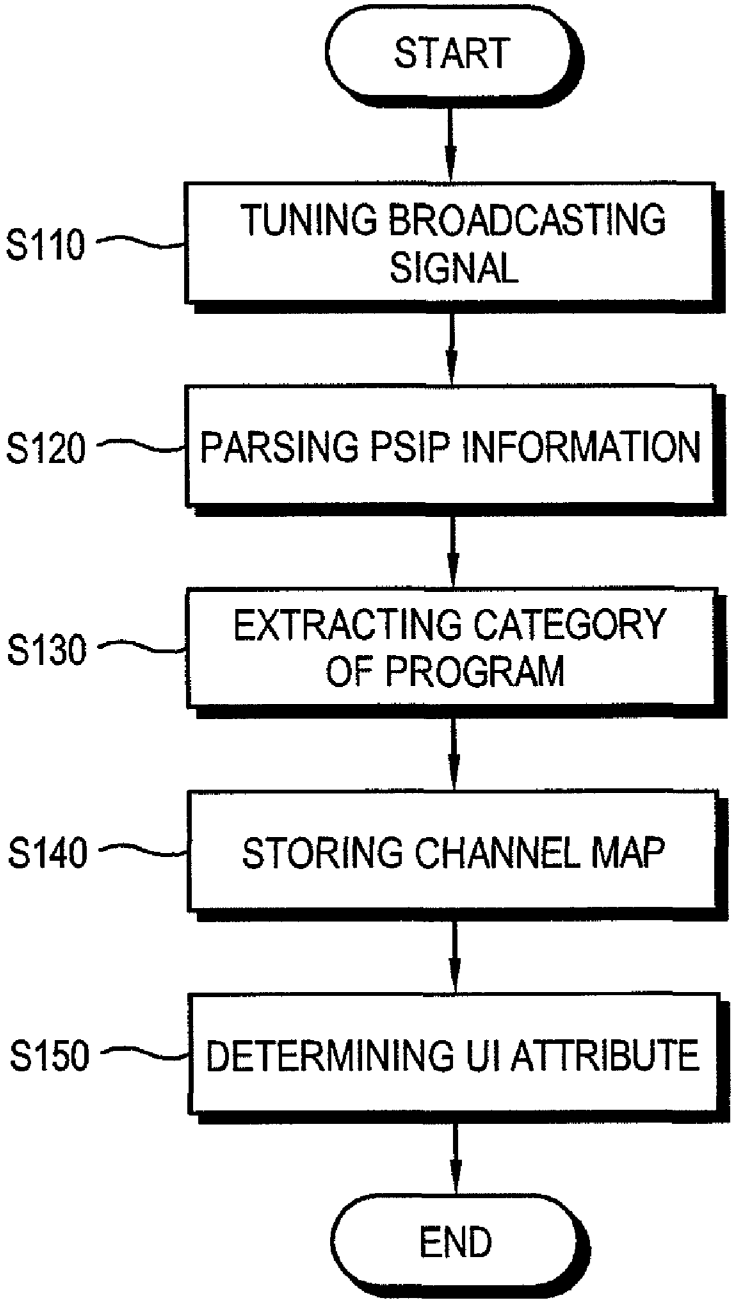
FIG. 6 is a flowchart showing an image processing method according to a second exemplary embodiment of the present invention.

FIG. 6 is a flowchart showing an image processing method according to a second exemplary embodiment of the present invention.

First, as shown in FIG. 6, the broadcasting signal is tuned (S110), and then, PSIP information is parsed from the tuned broadcasting signal (S120).

Next, the category of the program is extracted from the PSIP information parsed in the step S120 (S130).

Then, information on the channel receiving the broadcasting signal is stored in a channel map (S140). Herein, the information stored in the channel map may be stored corresponding to the category extracted in the step S130.

Then, the UI attribute is determined corresponding to the category of the program extracted in the step S130, and the UI is generated (S150). When generating the UI, the previously user set attribute of the UI corresponding to the category of the program is determined. Such previously set attribute of the UI corresponding to the categories may be stored in the storage unit 70.

As described above, an image processing apparatus and an image processing method according to the present invention can generate a user interface having different attributes according to a category of a program so that a user can grasp the category of the program without difficulty.

Further, according to the image processing apparatus and the image processing method, a UI attribute corresponding to the category of the program can be set as wanted by the user, thereby improving user's convenience.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing apparatus comprising:

a tuner which receives a broadcasting signal of a program corresponding to at least one of a plurality of categories;

a UI processor which generates a UI having at least one of a plurality of attributes and capable of being displayed for the program;

an image processor which performs image processing for the received broadcasting signal; and a controller which controls the UI processor so that the attribute of the UI can correspond to the category of the program, wherein the UI attribute comprises at least one of different fonts and different themes which are set corresponding to the category of the program; and wherein the controller determines if a same UI font or a same UI theme is set corresponding to different categories, and outputs a predetermined message if the same UI font or the same UI theme is set corresponding to the different categories.

2. The image processing apparatus according to claim 1, wherein the UI attribute further comprises a color.

3. The image processing apparatus according to claim 2, further comprising a memory device which stores information on the UI attribute corresponding to one or more categories, wherein the controller determines the UI attribute corresponding to the category according to the stored information.

4. The image processing apparatus according to claim 2, wherein the UI attribute is downloaded externally.

5. The image processing apparatus according to claim 1, the category of the program comprises at least one of a movie, a drama, news, sports, and a documentary.

6. The image processing apparatus according to claim 5, further comprising a display unit which displays the generated UI.

7. The image processing apparatus according to claim 6, wherein the controller controls the UI processor to display the UI on the display unit during tuning a channel selected among the plurality of channels.

8. The image processing apparatus according to claim 6, further comprising a user input unit through which a user's instruction for the UI attribute is inputted, wherein the controlling unit determines the UI attribute corresponding to the category according to the inputted instruction.

9. The image processing apparatus according to claim 8, wherein the controller controls the UI processor to generate an attribute setting UI for setting the UI attribute and to display the attribute setting UI on the display unit.

10. The image processing apparatus according to claim 9, wherein, in the case of setting the plurality of attributes, the controller controls the UI processor to reflect the previously set attribute to the attribute setting UI to be displayed on the display unit.

11. The image processing apparatus according to claim 1, wherein the UI is displayed automatically in response to a channel change.

12. The image processing apparatus according to claim 11, wherein the attribute of the UI comprises of an icon.

13. The image processing apparatus according to claim 12, wherein the channel number and/or the channel name is displayed along with the icon.

14. The image processing apparatus according to claim 13, wherein the channel number and/or the channel name is displayed according to the attribute of the UI which includes color information corresponding to the category.

15. The image processing apparatus according to claim 13, wherein the color of the UI is corresponds to the attribute of the UI which includes color information corresponding to the category.

16. The image processing apparatus according to claim 1, wherein the UI attribute comprises of an icon corresponding to the category.

17. The image processing apparatus according to claim 16, wherein the icon visually corresponds to the nature of the category.

18. The image processing apparatus according to claim 16, wherein the UI attribute further comprises of sound information.

19. An image processing method comprising:

receiving a broadcasting signal of a program corresponding to at least one of a plurality of categories;

generating a UI capable of being displayed for the program so that a UI attribute having at least one of a plurality of attributes can correspond to the category of the program, wherein the UI attribute comprises at least one of different fonts and different themes which are set corresponding to the category of the program; and wherein if a same UI font or a same UI theme is set corresponding to different categories, a predetermined message is output if the same UI font or the same UI theme is set corresponding to the different categories.

20. The image processing method according to claim 19, wherein the UI attribute further comprises a color.

21. The image processing method according to claim 20, wherein the generating the UI comprises: receiving a user's instruction for the UI attribute, and determining the UI attribute corresponding to the category according to the user's instruction.

22. The image processing method according to claim 21, wherein the generating the UI further comprises: generating an attribute setting UI for setting the UI attribute, and displaying the generated attribute setting UI.

23. The image processing method according to claim 22, wherein the displaying the attribute setting UI reflects the previously set attribute to the attribute setting UI to be displayed in the case of setting the plurality of UI attributes.

24. The image processing method according to claim 20, wherein the generating the UI further comprises: storing information on the UI attribute, and determining the UI attribute corresponding to the category according to the stored information.

25. The image processing method according to claim 19, the category of the program comprises at least one of a movie, a drama, news, sports, and a documentary.

26. The image processing method according to claim 19, wherein the generating the UI comprises displaying the generated UI.

27. The image processing method according to claim 26, wherein the displaying the generated UI displays the UI during tuning a channel selected among a plurality of channels.

* * * * *